(12) United States Patent
Riesen et al.

(10) Patent No.: US 8,890,102 B2
(45) Date of Patent: Nov. 18, 2014

(54) RADIATION STORAGE PHOSPHOR AND APPLICATIONS

(71) Applicant: Dosimetry & Imaging Pty Limited, New South Wales (AU)

(72) Inventors: Hans Riesen, Hughes (AU); Wieslaw Aleksander Kaczmarek, Garran (AU)

(73) Assignee: Dosimetry & Imaging Pty Limited (AU)

( * ) Notice: Subject to any disclaimer, the term of this patent is extended or adjusted under 35 U.S.C. 154(b) by 0 days.

(21) Appl. No.: 13/785,821

(22) Filed: Mar. 5, 2013

(65) Prior Publication Data

US 2013/0221249 A1     Aug. 29, 2013

Related U.S. Application Data

(63) Continuation of application No. 11/721,906, filed as application No. PCT/AU2005/001905 on Dec. 16, 2005, now Pat. No. 8,405,060.

(30) Foreign Application Priority Data

Dec. 17, 2004   (AU) ................. 2004907192

(51) Int. Cl.
  G03C 5/16    (2006.01)
  G01T 1/10    (2006.01)
  C09K 11/77   (2006.01)
  G03B 42/02   (2006.01)
  G21K 4/00    (2006.01)
  G01T 1/105   (2006.01)
  G01T 1/20    (2006.01)

(52) U.S. Cl.
  CPC .............. *G01T 1/10* (2013.01); *C09K 11/7705* (2013.01); *C09K 11/7763* (2013.01); *G03B 42/02* (2013.01); *G21K 4/00* (2013.01); *G01T 1/105* (2013.01); *G01T 1/2012* (2013.01); *G21K 2004/06* (2013.01)
  USPC ......................................................... 250/581

(58) Field of Classification Search
  USPC ........................................................ 250/581
  See application file for complete search history.

(56) References Cited

U.S. PATENT DOCUMENTS 3,438,881 A   4/1969  Kiss
3,582,623 A   6/1971  Rothery et al.
(Continued)

FOREIGN PATENT DOCUMENTS

AU    2008101046    1/2009
AU    2010100473    6/2010
(Continued)

OTHER PUBLICATIONS

Chen et al., "Stimulated luminescence and photo-gated hole burning in BaFClBr:Sm2+,Sm3+ phosphors," 1999, Journal of Physics and Chemistry of Solids, vol. 60, pp. 371-378.*

(Continued)

*Primary Examiner* — Kiho Kim
(74) *Attorney, Agent, or Firm* — Meunier Carlin & Curfman, LLC

(57) ABSTRACT

The present invention relates to a photoexcitable storage phosphor which comprises at least one rare earth element in the trivalent +3 oxidation state and wherein upon irradiation by X-ray, γ-ray or UV radiation the trivalent +3 oxidation state is reduced to divalent +2 oxidation state. The present invention also relates to a dosimeter, radiation image storage panel comprising the phosphor of the present invention and in dosimetry applications for applications including scientific, medical and other imaging applications. The present invention also relates to a process for making a photoexcitable storage phosphor and a process for recording and reproducing an image.

29 Claims, 11 Drawing Sheets

(56) References Cited

U.S. PATENT DOCUMENTS

| | | | |
|---|---|---|---|
| 4,100,101 | A | 7/1978 | Messier |
| 4,524,016 | A | 6/1985 | Ferretti |
| 4,954,714 | A | 9/1990 | Pollak et al. |
| 5,034,607 | A | 7/1991 | McAllister |
| 5,179,281 | A | 1/1993 | Twail et al. |
| 5,227,097 | A | 7/1993 | Brandner et al. |
| 5,427,868 | A | 6/1995 | Bringley et al. |
| 5,548,126 | A * | 8/1996 | Exelmans et al. ............ 250/588 |
| 5,569,926 | A | 10/1996 | Leblans et al. |
| 5,612,541 | A | 3/1997 | Hoffmann et al. |
| 5,990,485 | A | 11/1999 | Willems et al. |
| 6,087,666 | A | 7/2000 | Huston et al. |
| 6,452,203 | B1 | 9/2002 | Struye et al. |
| 6,642,650 | B1 | 11/2003 | Struye et al. |
| 7,399,977 | B2 | 7/2008 | Rink et al. |
| 7,713,624 | B2 * | 5/2010 | Meyer et al. .................. 428/403 |
| 2002/0104974 | A1* | 8/2002 | Hosoi .......................... 250/584 |
| 2003/0032192 | A1 | 2/2003 | Haubold et al. |
| 2003/0042445 | A1* | 3/2003 | Mitchell et al. ............... 250/584 |
| 2003/0064532 | A1* | 4/2003 | Chen ................................ 438/3 |
| 2003/0125616 | A1 | 7/2003 | Black et al. |
| 2003/0203205 | A1 | 10/2003 | Bi et al. |
| 2004/0091410 | A1* | 5/2004 | Nakane et al. ................ 423/263 |
| 2004/0227095 | A1* | 11/2004 | Gerstenmayer et al. ... 250/370.1 |
| 2006/0022157 | A1 | 2/2006 | Rieser |
| 2006/0145091 | A1 | 7/2006 | Patel |
| 2007/0040129 | A1 | 2/2007 | Maeda |
| 2007/0254981 | A1 | 11/2007 | DiMaio et al. |

FOREIGN PATENT DOCUMENTS

| | | |
|---|---|---|
| EP | 503163 | 9/1992 |
| EP | 591 746 | 4/1994 |
| GB | 1254271 | 11/1971 |
| JP | 2001 011440 | 1/2001 |
| JP | 2002-071811 | 3/2002 |
| SU | 1668960 | 8/1991 |
| SU | 1836643 | 8/1993 |
| SU | 952 037 | 4/1996 |
| WO | WO2004/096944 | 11/2004 |
| WO | WO2006/063409 | 6/2006 |
| WO | 2007/120441 A2 | 10/2007 |
| WO | 2009/052568 A1 | 4/2009 |
| WO | 2010/132569 | 11/2010 |

OTHER PUBLICATIONS

Chen et al., Stimulated luminescence and photo-gated hole burning in BaFC10.8Br0.2:Sm2+,Sm3+ Phosphors, *J. of Physics and Chemistry of Solids*, 60:371-378 (1999).

Fuji Phot Film KK, Apr. 25, 1983.

Matsushita Elec. Works, Aug. 21, 1981.

Tokyo Shibaura Elec. Ltd., Dec. 10, 1980.

Extended European Search Report for Application No. 10827723.7 dated Apr. 4, 2013.

Falin et al., EPR of Sm3+ in BaFCl single crystal, *J. of Physics: Condensed Matter*, 16:1293-1298 (2004).

Gurvich et al., Luminescence of Samarium-Activated $BaF_2$_$BaCl_2$ Phosphors, *J. of Applied Spectroscopy*, 49(2): 813-817 (1988).

Mikhail, P. et al., Bleaching of $Sm^{2+}$ During Photoluminescence and Cathodoluminescence, *Optics Communications*, 188:111-117 (2001).

Qin, W. et al., Photo-Bleaching Effect in Divalent Samarium-Doped Alkaline-Earth Fluorohalides, *J. of the Korean Physical Society*, 45:512-517 (2004).

Riesen, H. et al., Efficient X-ray Generation of $SM^2$ in Nancrystalline BaFCI/$SM^{3+}$: A Photoluminescent X-ray Storage Phosphor, *Inorg. Chem.*, 46:7235-7237 (2007).

Secu et al., Preparation and optical properties of BaFCl:Eu2+ X-ray storage phosphor, *Optical Materials*, 15:115-122 (2000).

Su et al., X-ray storage phosphors, their properties and mechanism, *J. of Alloys and Compounds*, 225:539-543 (1995).

Zeng, Q. et al., Luminescence Properties of $SM^{2+}$-Activated Barium Chloroborates, *J. of Luminescence*, 104:65-76 (2003).

Zhang et al., High-temperature stability of a special hole burnt in Sm-doped SrFCl crystals, *Optics Letters*, 17(16):1146-1148 (1992).

Tokyo Shibaura Elec. Ltd., Mar. 30, 1976.

Heyes et al., Enhanced biological effectiveness of low energy X-rays and implications for the UK breast screening programme, British J. of Radiology, 79:195-200 (2006).

International Search Report for PCT/AU2010/001476, mailed Dec. 16, 2010.

Akselrod MS et al. "A radiation dosimetry method using pulsed optically stimulated luminescence", Radiation Protection Dosimetry vol. 81, No. 3, pp. 167-176 (1999) Nuclear Technology Publishing.

Su M-Z et al. "The charge transfer excitation of trivalent rare earth ions Sm3+, Eu3+, Gd3+, Ho3+, Er3+ and Yb3+ emission in BaFCl crystals", Materials Research Bulletin, Elsevier. Kidlington, GB, vol. 22, No. 1, Jan. 1, 1987, pp. 89-94.

H. Hagemann, F. Kubel, H. Bill, F. Gingl, "$^5D_0 \rightarrow {}^7F_0$ transitions of $Sm^{2+}$ in $SrMgF_4$:$Sm^{2+}$" Journal of Alloys and Compounds 374 (2004) 194-196.

H.V. Lauer Jr, F.K. Fong, "Role of the $4f^55d$ band in the radiationless $^5D_1 \rightarrow {}^5D_0$ coupling in $BaCl_2$:$Sm^{2+}$" Journal of Chemical Physics 65 (1976) 3108-3117.

\* cited by examiner

RADIATION STORAGE PHOSPHOR AND APPLICATIONS

This application is a continuation of copending U.S. application Ser. No. 11/721,906, filed on Dec. 9, 2008, which is a U.S. National Phase entry of International Application No. PCT/AU2005/001905, filed on Dec. 16, 2005, which claims priority to Australian Patent Application No. 2004907192, filed Dec. 17, 2004, all three of which are herein incorporated by reference in their entirety.

TECHNICAL FIELD

The present invention relates to a photoexcitable storage phosphor. In particular, the present invention relates to a photoexcitable storage phosphor which is able to be used for X-ray, γ-ray or UV radiation imaging applications and in radiation dosimetry, and the like. In particular, the present invention relates to a photoexcitable storage phosphor which comprises a rare earth element in the trivalent +3 oxidation state.

The present invention also relates to processes for preparing a photoexcitable storage phosphor. The present invention further relates to an image plate comprising the photoexcitable storage phosphor and processes for production of an image plate comprising the photoexcitable storage phosphor and other uses of the image plate in various applications including medical and scientific imaging and dosimeters which are used for personal and environmental radiation monitoring and radiation monitoring in radiation therapy. The present invention also relates to a dosimeter comprising the photoexcitable phosphor of the present invention. The present invention further relates to readout techniques for the photoexcitable storage phosphors of the present invention.

BACKGROUND OF THE INVENTION

In early applications of X-ray imaging and radiation dosimetry, photographic emulsions were directly exposed to X-rays. However, silver based films are highly inefficient in the capture of X-rays and thus fluorescent screens were introduced. The use of fluorescent screens for imaging applications involve X-rays, which have passed through or radiate from an object, which are then converted to visible light by a radiation sensitive phosphor layer. The radiation sensitive phosphor layer is typically present on a fluorescent screen (or an X-ray conversion screen).

The visible light is recorded by a conventional silver based emulsion film or plate. Scintillators are used in intensifying screens which are required to be relatively strong absorbers of X-rays. The scintillators emit light in the wavelength region of the highest sensitivity of the silver based emulsion film. The resultant exposed photographic emulsions then require wet chemical processing.

A further method of recording X-ray images comprises employing a temporary storage medium, known as an imaging plate (IP). In contrast to the previous film-screen method, where the X-rays are directly converted into visible light by the scintillators, X-ray storage phosphors store the radiation image in proportion to the intensity distribution of the X-ray.

The advantages of this method have only been recently appreciated due to advanced laser and computing technologies. In this further method, an X-ray storage medium such as a radiation image conversion panel comprises a photostimulable phosphor.

A schematic "flow" diagram illustrating this method is depicted in FIG. 10. An imaging plate comprising a photostimulable storage phosphor is subject to X-ray irradiation 1010. The X-rays are converted into stored energy in the photostimulable storage phosphor 1020 for later readout of the latent image by photostimulation 1030. The latent image may be erased to recycle the imaging plate 1040.

The imaging plate comprising the photostimulable storage phosphor absorbs X-ray radiation which has passed through or radiated from an object. It is suggested that the photostimulable storage phosphor absorbs or stores the X-ray radiation due to the creation of metastable electron-hole pairs in the photostimulable storage phosphor.

In order to release the latent X-ray radiation energy stored in the photostimulable storage phosphor, the photostimulable storage phosphor is exposed to visible or infrared laser light. This is also known as the readout step. It is believed that the step of photo-stimulation leads to the recombination of the electron-hole pairs, which in turn leads to the emission of visible light. Ideally, the photostimulable storage phosphor stores as much of the incident X-ray energy as possible, and does not emit the stored X-ray energy (described as fading) until the photostimulable storage phosphor is exposed to visible or infrared laser light.

Presently, laser light in the wavelength range of 400 to 900 nm is used in the readout step. The photostimulable storage phosphors typically exhibit a photostimulated emission with a wavelength range of 300 to 500 nm. The stimulated emission is detected by photoelectric detectors which produce an electric signal whose amplitude is linearly proportional to the light level of the emission.

The electric signal produced from the emission is then converted into a digital format such that the radiation image can be displayed on a video screen. This type of recording of an image is called digital radiography or computed radiography. Photostimulable storage phosphors have the potential of enabling X-ray imaging (e.g. medical imaging) at much lower dosages, as compared to conventional film-screen radiography whilst still providing a sufficient, if not higher, level of information. However, in practice it appears that commercially available imaging plates still require dosages comparable to the film-screen method.

A third method employs all solid state digital detectors. In these detectors the X-rays are converted by a scintillator screen (containing CsI particles) to light which is subsequently detected by a silicon panel in the form of a photodiode/transistor array.

The electric signal of the photodiode/transistor array is then converted to a digital format and displayed on a video screen. The disadvantages of the use of digital detectors include low resolution (>100 μm) and considerably higher cost. Further, digital detectors cannot be used in certain applications with restricted space such as dental X-ray imaging which is an important application. It is generally believed that digital detectors and imaging plates are complementary and both will be required for many applications.

The photostimulable storage phosphors presently known contain centres for the capture of X-ray generated electrons and holes. It is believed that X-ray irradiation creates F centres in halide crystals. F centres are anion vacancies occupied by electrons where the $F^+$ centre is the anion vacancy without a trapped electron. For example, in a $BaBrF:Eu^{2+}$ storage phosphor where the europium in a divalent oxidation state, both the $F^+(Br^-)$ and the $F^+(F^-)$ defects can act as electron storage centres whereas the $Eu^{2+}$ acts as a hole trap.

Upon X-ray irradiation of the typical $BaBrF:Eu^{2+}$ X-ray storage phosphor electron-hole pairs are created. The electrons and holes are trapped at the $F^+$ defects and the hole trap, $Eu^{2+}$, respectively. However, at room temperature some electron-hole pairs recombine immediately after their creation without being trapped and lead to spontaneous emission (scintillation) which is undesirable. Upon photostimulation of the F centres at 2.1 eV or 2.5 eV for the F(Br$^-$) and F(F$^-$) centres, respectively, the electrons recombine with the holes and transfer excitation energy to the activator, Eu$^{2+}$, which in turns leads to broad 4f$^6$5d-4f$^7$ emission at about 390 nm.

Despite the developments in phosphor preparation and processing, the main problems in the prior art remains the same. In all these prior art activated storage phosphors the level of spontaneous emission of the phosphors continues to be high.

Also, the stored information is lost (erased) by the readout process.

Furthermore, the annealing process for the prior art storage phosphors suffers from the disadvantage that under normal conditions, the X-ray storage efficiency of the phosphor is low. In the prior art, in order to achieve a high efficiency of the storage phosphor, a higher annealing temperature must be used but the afterglow becomes more of a problem as a result of the large crystal size. Accordingly, in prior art annealing processes, the use of a firing temperature is in the range of 850° to 1100° C.

The final annealing process for the prior art phosphors also has to be performed in the presence of an atmosphere which is typically a nitrogen or an argon atmosphere. The use of atmospheres of hydrogen and hydrogen mixtures with other gases are avoided in the prior art annealing process.

Dosimeters are useful for measuring a radiation dose equivalent to the human body. In particular, the personnel dosimeters include a thermo luminescent dosimeter (TLD) which comprises a TLD phosphor. The prior art TLD phosphors (e.g CaSO$_4$:Dy) suffer from disadvantages which do not allow the TLD phosphors to be readily and cost effectively used for personal monitoring applications. These disadvantages are essentially due to the light sensitivity and stability of the prior art phosphors.

In view of the above, there is therefore a need for a photoexcitable storage phosphor and processes of production thereof with greater efficiency than hitherto achievable, for applications such as X-ray diagnostics, high resolution imaging work in scientific imaging and dosimeters (badges), particularly in personal and environmental radiation monitoring and in radiation monitoring in radiation therapy.

OBJECT OF THE INVENTION

It is an object of the present invention to overcome or substantially ameliorate at least one of the above disadvantages or provide an alternative phosphor or process to the prior art.

SUMMARY OF THE INVENTION

In an embodiment of the present invention there is provided a photoexcitable storage phosphor comprising a rare earth element in the trivalent +3 oxidation state and wherein upon irradiation by x-ray, γ-ray or UV radiation the trivalent +3 oxidation state is reduced to divalent +2 oxidation state. The photoexcitable storage phosphor may be a phosphor comprising a rare earth element in the trivalent +3 oxidation state before irradiation. The +3 oxidation state may be reduced to +2 oxidation state upon UV, X-ray, and γ-ray radiation. The rare earth element may be selected from the group consisting of cerium, praseodymium, neodymium, promethium, samarium, europium, gadolinium, terbium, dysprosium, holmium, erbium, thulium, ytterbium and lutetium. In particular, the rare earth element may be selected from the group consisting of samarium, europium, dysprosium and gadolinium. In a particular embodiment of the present invention, the rare earth element may be samarium.

The photoexcitable storage phosphor may also comprise one or more halogen group elements. The halogen elements may be selected from the group consisting of fluorine, chlorine, iodine and bromine. The photoexcitable storage phosphor may also comprise an alkaline earth metal. The alkaline earth metal may be selected from the group consisting of barium, calcium and strontium. In particular, the alkaline earth metal may comprise barium or strontium. In a particular form of the present invention, the alkaline earth metal may be barium.

In a further embodiment, the photoexcitable storage phosphor of the present invention is represented by a formula (A):
MeX$^1$X$^2$:RE$^{3+}$, wherein Me represents a metal ion,
X$^1$ and X$^2$ are independently a halogen atom selected from the group consisting of fluorine, chlorine, bromine and iodine; and
RE is a rare earth element.

The metal ion Me in the photoexcitable storage phosphor as represented by Formula (A) of the present invention may be a divalent metal ion or may be an alkaline earth metal or Group II metal ion. In the formula (A), X$^1$ and X$^2$ may be the same as each other. In one form of the present invention, X$^1$ is F. In particular, the alkaline earth metal ion may be strontium, barium or calcium.

The photoexcitable storage phosphor of the present invention may comprise a divalent metal halide and which is activated by a rare earth element in the trivalent +3 oxidation state. The photoexcitable storage phosphor of the present invention may also be an alkaline metal halide which is activated by a rare earth metal in the trivalent +3 oxidation state. In particular, the photoexcitable storage phosphor may be an alkaline metal fluorohalide which is activated by a rare earth metal in the trivalent oxidation state. Upon X-ray or UV irradiation the rare earth ion in the trivalent oxidation state is reduced to the divalent oxidation state by the release of electrons from F-centres etc. i.e. the rare earth ion in the trivalent state acts as the electron trap. The resulting divalent state may be a deep trap and thus photoexcitable, enabling multiple readout of the same centre without recombination of the electron-hole pair.

The photoexcitable storage phosphor of formula MeX$^1$X$^2$:RE$^{3+}$, may consist of tetradecahedral crystals, and may crystallize in the space group P4/nmm (D$^7$4h) but other symmetries may also be present for isomorphous materials.

As an example, the photoexcitable storage phosphor of the present invention may be represented by the formula BaFCl:RE$^{3+}$ wherein RE$^{3+}$ is a rare earth metal ion.

In a particular example of the present invention, the photoexcitable storage phosphor is represented by the formula BaFCl:Sm$^{3+}$, CaFCl:Sm$^{3+}$, SrFCl:Sm$^{3+}$, or BaFCl:Dy$^{3+}$.

The optimal photoexcitable storage phosphor may have a crystal grain size of between about 10 to about 1000 nm, about 20 to about 1000 nm, about 30 to about 1000, about 40 to about 900 nm, about 50 to about 800 nm, about 60 to about 750 nm, about 70 to about 700 nm, about 80 to about 650 nm, about 90 to about 600 nm, about 100 to about 500 nm, about 100 to about 450 nm, about 100 to about 400 nm, about 100 to about 350 nm, about 100 to about 300 nm, about 100 to about 250 nm and about 100 to about 200 nm. In contrast, a crystal grain size of 1-30 microns is optimal for the prior art phosphors.

In a further embodiment of the present invention, there is provided a radiation image storage panel comprising a photoexcitable storage phosphor of the present invention. The radiation image conversion panel may be an imaging plate comprising the photoexcitable storage phosphor which absorbs X-ray radiation which has passed through or radiated from an object.

The radiation image storage panel may comprise a photoexcitable storage phosphor represented by the formula MeFX:RE$^{3+}$, wherein:
Me represents a metal ion,
X is a halogen selected from the group consisting of chlorine, bromine and iodine and
RE is a rare earth element.

In another embodiment of the invention there is provided a process for producing a photoexcitable storage phosphor of the present invention comprising combining a first solution and a second solution to form a reaction mixture, wherein the first solution comprises a metal halide and a rare earth halide, wherein the halides are independently selected from the group consisting of chloride, bromide and iodide, and the second solution comprises a fluoride species.

The fluoride species may be any suitable fluoride species suitable for the process and may be a fluoride and as an example may be ammonium hydrogen difluoride.

The metal in the metal halide may be a divalent metal and in particular may be a Group II metal or alkaline earth metal. The metal in the metal halide may be strontium, barium or calcium. In particular, the metal halide may be barium chloride.

The rare earth metal in the rare earth halide may be selected from the group consisting of cerium, praseodymium, neodymium, promethium, samarium, europium, gadolinium, terbium, dysprosium, holmium, erbium, thulium, ytterbium and lutetium. In particular, the rare earth element is samarium, dysprosium, europium or gadolinium. An example of the rare earth halide is samarium chloride.

The concentration of the metal halide in the first solution may be about the same as the concentration of the fluoride species in the second solution.

The concentration of metal halide in the first solution may be in the range of between about 0.10 and about 1.5M, about 0.10 to about 1.4M, about 0.10 to about 1.3M, about 0.10 to about 1.2M, about 0.10 to about 1.1M, about 0.10 to about 1.0M, about 0.10 to about 0.95M, about 0.10 to about 0.90M, about 0.10 to about 0.85 M, about 0.10 to about 0.80 M, about 0.10 to about 0.75M, about 0.10 to about 0.70 M, about 0.10 to about 0.65 M, about 0.10 to about 0.60M, about 0.10 to about 0.55M, about 0.15 to about 0.50M, about 0.20 to about 0.50M, about 0.25 to about 0.50M, about 0.30 to about 0.45M, about 0.35M to about 0.45M and about 0.40M.

The concentration of the rare earth halide in the first solution may be in the range of from about 0.01% and about 5%, about 0.02% to about 4.5%, about 0.03% to about 4.0%, about 0.04% to about 3.5%, about 0.05% to about 3.0%, about 0.06% to about 2.5%, about 0.07% to about 2.0 wt %, about 0.08% to about 1.75%, about 0.9% to about 1.50%, about 0.1% to about 1.25%, about 0.15% to about 1.0% of the metal halide concentration. The concentration of the fluoride species in the second solution may be in the range of between about 0.10 and about 1.5M, about 0.10 to about 1.4M, about 0.10 to about 1.3M, about 0.10 to about 1.2M, about 0.10 to about 1.1M, about 0.10 to about 1.0M, about 0.10 to about 0.95M, about 0.10 to about 0.90M, about 0.10 to about 0.85 M, about 0.10 to about 0.80 M, about 0.10 to about 0.75M, about 0.10 to about 0.70 M, about 0.10 to about 0.65 M, about 0.10 to about 0.60M, about 0.10 to about 0.55M, about 0.15 to about 0.50M, about 0.20 to about 0.50M, about 0.25 to about 0.50M, about 0.30 to about 0.45M, about 0.35M to about 0.45M, about 0.40M and about 0.2 M.

The process for producing a photoexcitable storage phosphor of the present invention may also be conducted by forming a microemulsion system comprising a surfactant, an oil phase and an aqueous phase for the first and second solutions respectively. A co-surfactant may also be added to the microemulsion system. The microemulsions may be prepared by solubilising different salt solutions in the surfactant/co-surfactant/oil phaseIaqueous solution. The typical weight ratio for microemulsions may be 10l15/15/60. The surfactant may be cetylammonium bromide or other isotactic surfactants.

The co-surfactant may be a C1 to C4 alcohol. In particular, the co-surfactant may be n-butanol.

The oil phase may be n-octanol or alcohols with similar properties.

The first solution may be maintained at a temperature within the range of between about 5 to about 100° C., or between about 5 to about 95° C., about 5 to about 90° C., or between about 5 to about 85° C., about 5 to about 80° C., or between about 5 to about 75° C., 5 to about 70° C., or between about 5 to about 65° C., 5 to about 60° C., or between about 5 to about 55° C., 5 to about 50° C., or between about 5 to about 45° C., 5 to about 40° C., or between about 5 to about 35° C., or between about 10 to about 30° C., or between about 10 to about 25° C., about 15 to about 25° C., or between about 20 to about 25° C. before and/or during the step of combining the first solution with the second solution. The step of combining may comprise adding the first solution to the second solution, or adding the second solution to the first solution. The step of combining may also comprise combining the first and second solutions in approximately equal volumes. The step of combining may further comprise stirring, swirling, shaking or agitating the first solution and/or the second solution.

A precipitate may form in the reaction mixture during and/or after the step of combining. The process may further comprise one or more of the steps selected from the group consisting of:
separating the precipitate from the reaction mixture;
washing the precipitate from the reaction mixture;
drying the precipitate from the reaction mixture; and
firing the precipitate.

The step of separating may include filtering, centrifuging, settling, triturating or some other suitable method of treating the precipitate known to a skilled person. In particular, the step of separating the precipitate from the reaction mixture may be by filtering or centrifuging.

The step of washing may comprise washing with a solvent, which may be a volatile solvent, a polar solvent, a dry alcohol (e.g. methanol, ethanol, isopropanol).

The step of drying may include heating, for example to a temperature in the range of between about 50 and about 150° C., about 55 to about 145° C., about 60 to about 140° C., about 65 to about 135° C., about 70 to about 130° C., about 75 to about 125° C., about 80 to about 120° C., about 80 to about 115° C., about 80 to about 110° C., about 80 to about 105° C., about 80 to about 100° C., about 80 to about 105° C., about 80 to about 100° C., about 85 to about 95° C., about 60 to about 80° C., about 65 to about 75° C. and about 70° C.

The step of drying may also include passing a gas over and/or through the precipitate. The gas may be a reducing gas, inert gas or air. In particular, the gas may be air, oxygen, argon, nitrogen, hydrogen, helium, carbon monoxide, carbon dioxide and mixtures thereof, or any other suitable gas known to a skilled person.

The step of firing may be at a temperature of between about 150 and about 800° C., about 200 and about 800° C., about 250 and about 800° C., about 300 and about 800° C., about 350 and about 800° C., about 400 and about 800° C., 450 and about 800° C., about 460 to about 800° C., about 470 to about 800° C., about 480 to about 800° C., about 490 to about 800° C., about 500 to about 800° C., about 500 to about 790° C., about 500 to about 780° C., about 500 to about 770° C., about 500 to about 760° C., about 500 to about 750° C., about 500 to about 740° C., about 500 to about 730° C., about 500 to about 720° C., about 500 to about 710° C., about 500 to about 700° C., about 500 to about 690° C., about 500 to about 680° C., about 500 to about 670° C., about 500 to about 660° C., about 500 to about 650° C., about 510 to about 650° C., about 520 to about 650° C., about 530 to about 650° C., about 540 to about 650° C.; about 550 to about 650° C., about 560 to about 650° C., about 570 to about 650° C., about 580 to about 650° C., about 590 to about 650° C., about 600 to about 650° C., about 610 to about 650° C., about 620 to about 650° C., about 630 to about 650° C., about 640 to about 650° C., and about 650° C.

The step of firing may be conducted for a period of time between about 0 to about 5.0 hours, about 0.1 to about 4.5 hours, about 0.1 to about 4.0 hours, about 0.1 to about 3.5 hours, about 0.1 to about 3.0 hours, about 0.1 to about 2.5 hours, about 0.1 to about 2.0 hours, about 0.1 to about 1.5 hours, about 0.1 to about 1.0 hours, about 0.1 to about 0.9 hours, about 0.1 to about 0.8 hours, about 0.1 to about 0.7 hours, about 0.1 to about 0.6 hours, about 0.1 to about 0.5 hours, between about 0.1 to about 0.4 hours, between about 0.1 to about 0.3 hours, between about 0.1 to about 0.2 hours and about 0.1 hours.

The step of firing may be conducted in an atmosphere including but not limited to, vacuum, air, hydrogen, helium, oxygen, argon, nitrogen, carbon monoxide, carbon dioxide, a reducing gas, an inert gas, an oxidizing gas or any other suitable gas known to a skilled person and also a mixture of one or more of the aforementioned gases.

In a further embodiment of the present invention, there is provided a process for recording and reproducing an image comprising the steps of:
  a) exposing a radiation image storage panel comprising a photoexcitable storage phosphor of the present invention to radiation which has passed through or radiated from an object;
  b) exposing the radiation image storage panel to an electromagnetic wave having a wavelength within a range of exciting light wavelength of the photoexcitable storage phosphor; and
  c) detecting the emitted light.

The object may be inorganic or organic in nature, for example a mammal or a part thereof. The mammal may be a human or animal patient. The object may be a breast of a human or animal patient and the process may be for recording a mammogram. The objects may also be teeth of a human or an animal and the process may be for recording dental X-ray images.

The exciting light source (electromagnetic wave) may be a laser which is capable of causing an emission from the photoexcitable storage phosphor. The emission may be a fluorescence emission. The laser may have a wavelength in the range of about 400 nm to about 900 nm. The laser may be selected from the group consisting of solid state lasers (e.g.Nd:YAG laser, Nd:YVO$_4$ laser, Nd:YLF laser), semiconductor lasers (e.g. GaN laser), gas lasers (e.g. He—Cd, Ar and Kr ion lasers), dye lasers and combinations of them. The exciting light may also be a light emitting diode (LED) or an incandescent light source.

The step c) of detecting the emitted light in the process for recording and reproducing an image of the present invention may comprise using a photomultiplier, photodiode, avalanche photodiode, transistor array, CCD camera, CMOS camera or the like to convert the emitted light to an electric signal.

The process for recording and reproducing an image of the present invention may further comprise a step of converting the electric signal from an analogue to digital format and inputting the digital signal to a video display means.

The video display means may include a computer screen, a computer monitor, a television screen, or any other video displays.

In a particular example of an embodiment of the present invention, the readout process may use a gating method for the exciting light and the emitted light, such as used in phosphoroscopes, that allows the detector to be closed when the phosphor is exposed to excitation light. A highly reliable method of facilitating this gating method is by means of a mechanical chopper if the lifetime of the photoexcited luminescence is longer than 500 microseconds. Another method is b employing a lock-in amplifier and a modulation technique.

In a further embodiment of the present invention, there is provided a radiation storage dosimeter comprising a photoexcitable storage phosphor of the present invention. In particular, there is provided a radiation storage dosimeter comprising a photoexcitable storage phosphor comprising a rare earth element in the trivalent +3 oxidation state and wherein upon irradiation by x-ray, γ-ray or UV radiation the trivalent +3 oxidation state is reduced to divalent +2 oxidation state.

The radiation storage dosimeter may be in the form of a thin film comprising the storage phosphor embedded in a flexible or rigid substrate.

In a further embodiment of the present invention, there is provided a radiation storage device comprising a photoexcitable storage phosphor comprising a rare earth element in the trivalent +3 oxidation state and wherein upon irradiation by x-ray, γ-ray or UV radiation the trivalent +3 oxidation state is reduced to divalent +2 oxidation state. The radiation storage device may also comprise means for indicating the presence of x-ray, γ-ray or UV radiation.

DETAILED DESCRIPTION OF THE PREFERRED EMBODIMENT(S)

Figure 1:
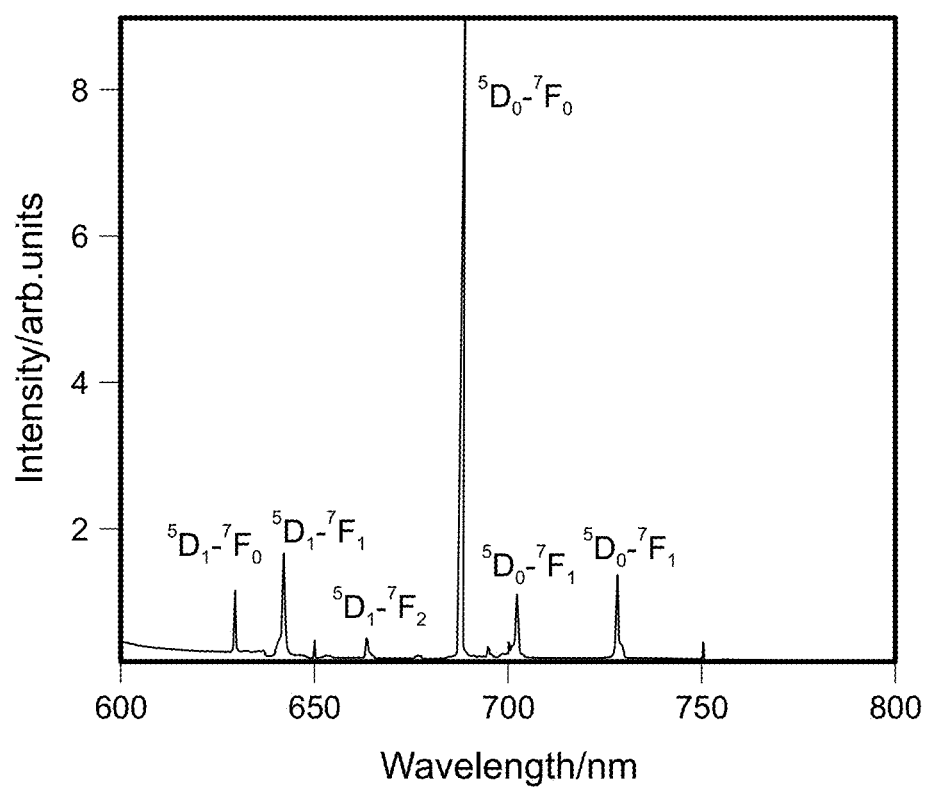
FIG. 1 is a graphical representation of luminescence intensity of a preferred embodiment of the photoexcitable storage phosphor, as prepared according to example 2 (see below), of the present invention after X-ray irradiation with respect to a wavelength range from 600 to 800 nm.

In a preferred embodiment of the present invention, the photoexcitable storage phosphor of the present invention is an X-ray storage phosphor. In particular, the photoexcitable storage phosphor of the present invention comprises rare earth metal ions in the trivalent +3 oxidation state. Upon exposure to X-rays, relatively stable divalent rare earth ($RE^{2+}$) metal ion traps are formed in $MeFXRE^{3+}$ e.g. $BaFCl:Sm^{3+}$ with oxygen and F-centre, and the like, defects.

These traps can be photoexcited by suitable wavelengths of energy yielding very narrow f-f luminescence lines. Although the X-ray induced centres are much more stable than the electron-hole pairs in the presently known X-ray storage phosphors, it is possible to bleach the phosphors of the present invention in the 350-550 nm wavelength range, so that the phosphors can be reused. The phosphor of the present invention, for example, $BaFCl:Sm^{3+}$ is a preferred example of an X-ray γ-ray or UV radiation storage phosphor of the present invention.

The photoexcitable storage phosphor of the present invention provides very narrow (in one example about 100 times narrower than presently known commercial storage phosphors) luminescence lines and hence a significantly increased contrast ratio. Further, because of the relative stability of the formed $Sm^{2+}$ centres, the information stored in the photoexcitable storage phosphor of the present invention can be read multiple times for imaging applications.

It is believed that the photoexcitable storage phosphors of the present invention will facilitate a reduction of X-ray dosages when used in imaging plates in medical diagnostics by at least a factor of 10, and more likely a factor of 100. This application is highly important since it is well established that current X-ray diagnostics may actually induce cancer and thus a reduction of X-ray dosage is highly desirable. Further, the same storage phosphor can be used in high resolution imaging work in scientific imaging and in dosimeters (badges and long sticks), particularly in personal and environmental radiation monitoring and in radiation monitoring in radiation therapy.

However, the process for the photoexcitable storage phosphor of the present invention is simpler when compared with the known phosphors which contain rare earth metal ions in the divalent +2 oxidation state. In respect of the photoexcitable storage phosphors of the present invention there is no need for a reducing or inert gas atmosphere in the annealing step because the storage mechanism of the phosphor of the present invention requires the rare earth ion to be initially in the trivalent +3 oxidation state. Importantly, the photoexcitable storage phosphors of the present invention can also be prepared without the annealing step. The annealing step can be used for the photoexcitable storage phosphors of the present invention to modify its sensitivity. For example, it is possible to lower the sensitivity by prolonged heat treatment in order to render a phosphor that is applicable for high dosage applications such as in radiation therapy. From the luminescence spectroscopy of samples that were not subject to X-ray irradiation it follows that the rare earth metal ions are mostly included in the +3 oxidation state into the crystal structure of barium fluorochloride. It is well established that BaFCl, and all the other related alkaline earth halides, contain $O^{2-}$ ion defects in their lattices. It has also been established by EPR spectroscopy that $O^{2-}$ ions serve as charge compensators when $Sm^{3+}$ is built into the BaFCl lattice.

No annealing or a relatively low annealing temperature (about 100 to 650° C.) may be employed to obtain the properties of the phosphor of the present invention. In general, at higher annealing temperatures and at longer annealing times the average crystal size increases for all ceramic materials. The increased temperature also results in a negative effect on the powder particle size because of surface melting and agglomeration effects.

That no annealing step is required or only an annealing step at low temperatures and short times may be applied in the process of production of the phosphors of the present invention are significant improvements over the existing process and results in an average crystal size of the phosphors being in the submicron range of about 10 to about 200 nm, about 10 to about 190 nm, about 10 to about 180 nm, about 10 to about 170 nm, about 10 to about 160 nm, about 10 to about 150 nm, about 10 to about 140 nm, about 10 to about 130 nm, about 10 to about 120 nm, about 10 to about 110 nm, about 10 to about 100 nm, about 10 to about 90 nm, about 10 to about 80 nm, about 10 to about 70 nm, about 10 to about 60 nm, about 10 to about 50 nm, about 10 to about 40 nm, about 10 to about 30 nm and about 10 to about 20 nm. Another improvement of the annealing process is that the particles of the phosphor of the present invention stay well separated.

The process of production of the phosphors of the present invention also does not require further requirements for the container (boat) construction material which may be used during the annealing step.

A preparation process for the prior art divalent phosphor leads to a broad phosphor particle size distribution with a typical range of 1 to 8 μm. Moreover, ball mills and other various mechanical grinding devices employed in the preparation process create substantial contamination of the phosphor and create irreversible and unpredictable damage to the phosphor microcrystals.

Figure 11:
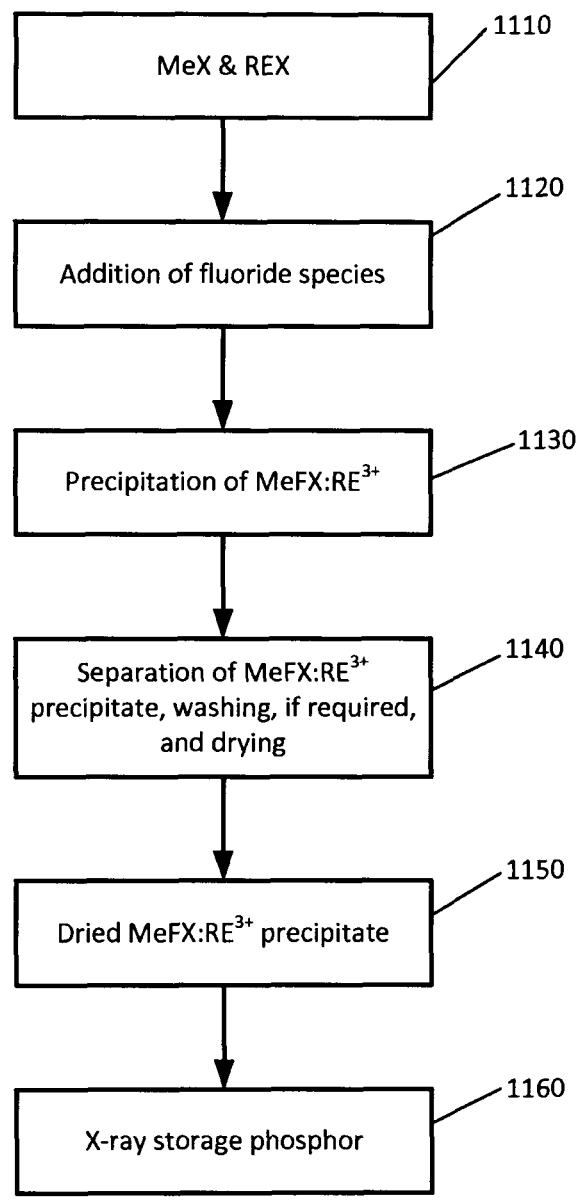
FIG. 11 is a schematic flowchart of a process for producing a photoexcitable storage phosphor.

A schematic flowchart of a preferred embodiment of a process for producing a photoexcitable storage phosphor of the present invention is shown in FIG. 11. The process begins with an aqueous solution including MeX and REX 1110, where Me is a metal ion, RE is a rare earth metal, and X is Cl, Br or I. The addition of fluoride species 1120 causes precipitation of McFX:RE$^{3+}$ 1130. The McFX:RE$^{3+}$ precipitate can be separated, washed, if required, and dried 1140. The dried MeFX:RE$^{3+}$ precipitate can be fired at a temperature between about 100° C. and about 800° C., if required 1150. The output/product of this process is the X-ray storage phosphor 1160.

If annealing is applied, the atmosphere in the firing of the precipitate may be air, oxygen, nitrogen, hydrogen, carbon monoxide, carbon dioxide, argon, a reducing gas, an inert gas or a vacuum.

The performance of imaging plates critically depends on the particle size of the phosphor. The efficiency of a photoexcitable storage phosphor depends on the particle size, and previous reports show that the ideal average particle size is in the range of 1 to 30 µm. However, with small particle size, moisture based deterioration of the phosphor properties becomes a problem. It is likely that the deterioration starts as soon as the calcined phosphor particles are exposed to air. To prevent the deterioration, it is necessary to store the calcined phosphor particles in a dry atmosphere. However, it is impractical and costly to conduct the entire preparation procedure, the manufacturing of the phosphor plate and the radiographic process in an inert atmosphere.

It is observed that the particle and crystal grain size of the storage phosphors of the present invention are significantly smaller (in the order of 10 times) compared to the existing known phosphors. In contrast to the known phosphors the properties of the phosphors of the present invention do not deteriorate and the fine powder formed therefrom is chemically stable in air and in high humidity.

It is envisaged that the photoexcitable storage phosphors of the present invention have particles with submicron size which are able to be easily applied in image plate manufacturing. Further, it is envisaged that the total density of imaging pixels can be significantly increased with an improved signal to noise (S/N) ratio.

As the practical use of the radiation image recording and reproducing method has advanced, there has been a growing demand for a photostimulable/photoexcitable storage phosphor which has a higher stimulated emission luminance (i.e., higher sensitivity, higher sharpness, and the like).

Whereas all known existing storage phosphors are activated by rare earth metal ions in their divalent oxidation state, and hence the rare earth metal ions acts as the hole trap, the photoexcitable phosphor of the present invention is based on the fact that the rare earth metal ions (for example Sm$^{3+}$) are in the trivalent oxidation state in the unirradiated form.

X-ray irradiation of the photoexcitable phosphors of the present invention leads to relatively stable Sm$^{2+}$ traps at room temperature, which can be photoexcited resulting in very narrow f-f luminescence lines. Despite being relatively stable, the latent image in the photoexcitable phosphors of the present invention are able to be reversibly bleached by photoionisation of the divalent rare earth metal ion (e.g. Sm$^{2+}$) traps in the 350 to 550 nm wavelength range. It has been observed that when using 488 nm light, this is most likely a two-step photoionisation process.

In order to achieve very high resolution in X-ray imaging, the grain size of the photostimulable/photoexcitable storage phosphor must be as small as practical. Consequently, it follows that the readout time for imaging plates with low grain-sizes and thus the maximum number of pixels increases substantially. Accordingly it is desirable to have a high scanning speed. However, the presently known phosphors exhibit a substantial reduction in sensitivity and total resolution when the reading speed is very high which results in an image lag. The image lag is characteristic for presently known phosphors and is the major drawback for fast scanning applications.

The image lag manifests itself by hazy or fuzzy images which are difficult to evaluate when viewing the image initially recorded. Computer aided sharpening processes must be applied, which may create distortions in the resulting radiological image.

The advantages of the photoexcitable storage phosphor of the present invention are as follows:
1. X-ray dose can be significantly reduced and image plates and dosimetry badges and the like based on the phosphor can be read many times without significant signal to noise (S/N) deterioration;
2. Photoexcited luminescence with very narrow line widths (below 0.5 nm). Hence the contrast ratio is increased;
3. The narrow line width of the emission compared with the existing phosphors leads to a significantly increased amplitude of the photoexcited emission;
4. Very small powder particles in the phosphor of the present invention have improved overall image quality—minimum 100-fold increase of pixel density;
5. No optical or electronic interactions between phosphor particles. Photoexcited emission from one grain has no influence on emission from the other one;
6. Stable to visible light and X-ray irradiated imaging plate and dosimetry badges and the like can be handled in light;
7. The image and the dosimetry badge and the like can be erased using the readout laser (or another intense light source in an appropriate wavelength range) running at high power;
8. The existing imaging technology can be modified for the use of the new phosphor by including gating and modulation techniques, taking advantage of the ca. 2 ms lifetime of the photoexcited state; and
9. The possibility to create original equipment with enhanced high resolution 2D image quality i.e. in the new field of X-ray nanography.

The imaging plate based on the phosphors of the present invention releases the stored energy when exposed to exciting light at high power. The radiation images can again be stored after the erasing process. Thus the imaging plate can be used repeatedly. In conventional radiography, a sheet of radiographic film is consumed for each photograph. Thus the X-ray storage imaging plate is advantageous in terms of conservation of resources and economical efficiency. It is desirable that imaging plates can be used as many times as possible without deteriorating. However, the problem with the existing photostimulable phosphors is that the prior art photostimulable phosphors generally have a tendency of moisture sorption. When the prior art photostimulable phosphor is exposed to an ambient atmosphere, the photostimulable phosphor absorbs atmospheric moisture and markedly deteriorates over time.

In addition, latent radiation images recorded by the prior art photostimulable phosphor generally fade after exposure to radiation by spontaneous electron-hole-recombination. This leads to low quality images when the time between exposure and readout is too long. Also, the latent picture fading is accelerated by moisture sorption.

The advantages of the image plate comprising the storage phosphor of the present invention are as follows:
1. Image plate with the storage phosphor of the present invention can be readout repetitively without any significant degradation in the picture quality, due to the increased stability of the electron traps (e.g. Sm$^{2+}$ centres).

2. There is the possibility to create original equipment with enhanced high resolution, high contrast 2D image quality i.e. in the new field of X-ray nanography.

The advantages of a dosimeter comprising the storage phosphor of the present invention are as follows:

Reading accuracy does not depend on parameters such as the heating rate since the readout is conducted by photoexcited luminescence and not by thermoluminescence;

Multiple readings are possible since the radiation storage material is relatively stable;

Dosimeter is able to work in a test-accumulation mode which includes multiple irradiation and reading;

Irradiation memory is not related to operation temperature;

Higher precision on rereading;

Long term response retention is not restricted; and

Reader units can be miniaturised to handheld devices.

Further, a dosimeter comprising the photoexcitable phosphor of the present invention is more stable for environmental conditions and is not sensitive to ambient visible light in contrast to prior art TLD or OSL phosphors.

This is highlighted by the fact that the dosimeter comprising the photoexcitable phosphor of the present invention does not require the phosphor to be contained in a capsule, stored in opaque containers or admixed with Teflon (PTFE) as is necessary with prior art TLD or OSL phosphors.

Thus, the dosimeter may comprise a thin film of the photoexcitable phosphor of the present invention.

The particle and crystal grain size of the photostimulable phosphors of the present invention are significantly smaller (x10) compared to the prior art phosphor materials. The applicants envisage that the average particle size will be even smaller upon further optimisation of the preparation process. In contrast to the prior art phosphors, the properties of the phosphor of the present invention do not deteriorate and the fine powder is chemically stable.

It is envisaged that the phosphor particles with submicron size can easily be applied in image plate Manufacturing. Moreover, the total density of imaging pixels can be significantly increased with an improved signal to noise (S/N) ratio.

As the practical use of the radiation image recording and reproducing method has advanced, there has been a growing demand for a photoexcitable phosphor which has a higher emission luminance (i.e., higher sensitivity, higher sharpness, and the like).

EXAMPLES OF THE INVENTION

Examples of processes of production of an X-ray storage phosphor of the formula MeFX:RE$^{3+}$ (X=Cl, Br, I) will now be described and in particular the production of BaFCl:Sm$^{3+}$ will be described in detail. It is to be understood that the scope of the present invention should not be limited to the following examples and/or preferred embodiment(s).

Preparation Routes

Examples of Processes of Preparation of the Photostimulable Phosphor of the Present Invention Example 1

This preparation is based on the reaction of two aqueous solutions. First, the salts other than the fluoride are dissolved in an aqueous solution. In a typical preparation, the hydrated barium chloride BaCl$_2$·2H$_2$O and samarium chloride SmCl$_3$·6H$_2$O (0.01-1 wt %) salts are added to water and dissolved under stirring to prepare a solution with a BaCl$_2$ concentration 0.4 M (mol/dm$^3$). The solution is kept at room temperature (20-25° C.). Then, the same volume of an aqueous solution of a fluoride salt, such as ammonium hydrogen difluoride NH$_4$F·HF with a molar concentration of 0.2 M is added to the solution. The obtained precipitate (i.e. phosphor crystals) is separated from the solution by centrifugation or filtration. The precipitate is then dried at a temperature 70° C. The above described process yields tetradecahedral crystals of the Sm$^{3+}$ activated barium fluorochloride phosphor with the space group P4/nmm (D$^7_{4h}$) symmetry. The main crystal grain size of the phosphor grains was found to be 100-200 nm.

Figure 2:
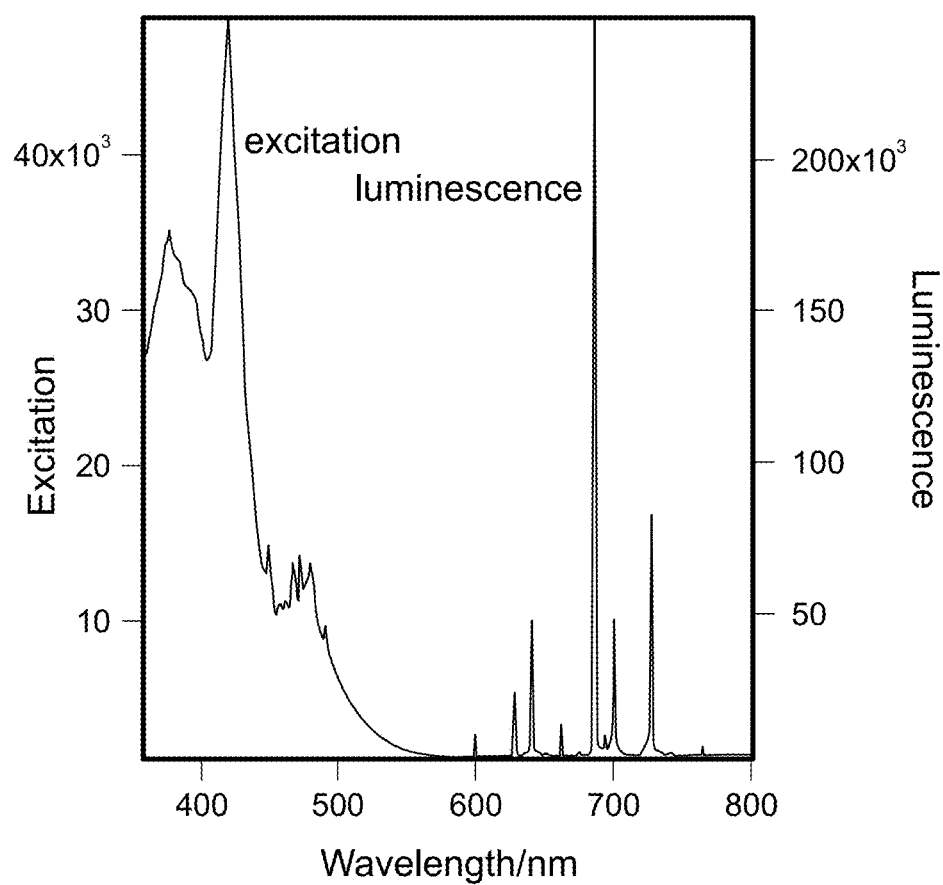
FIG. 2. is a graphical representation of the luminescence and excitation spectra of the photoexcitable storage phosphor, as prepared according to example 1 (see below), of the present invention after X-ray irradiation with respect to a wavelength range from 600 to 800 nm.

FIG. 2. is a graphical representation of the luminescence and excitation spectra of the photoexcitable storage phosphor, as prepared according to this example 1 after X-ray irradiation with respect to a wavelength range from 600 to 800 nm. FIG. 2. is a typical excitation and luminescence of Sm$^{2+}$ after X-ray irradiation of BaClF:Sm$^{3+}$ as prepared according to example 1. The spectra were measured by using a commercial spectrofluorometer.

Figure 4:
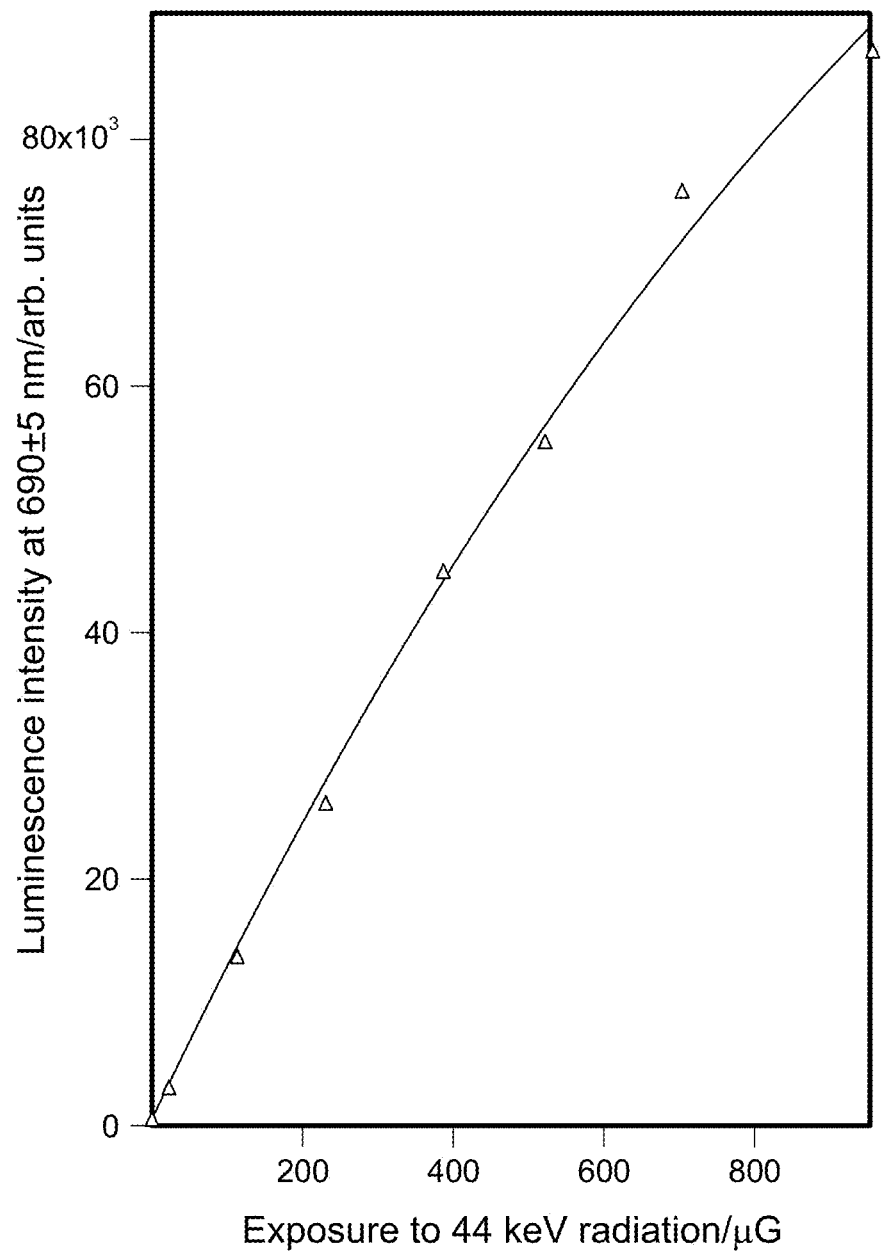
FIG. 4 is a graphical representation of the luminescence intensity of the photoexcitable storage phosphor as shown in FIG. 2 with respect to a calibrated X-ray exposure (microGray).

FIG. 4 is a graphical representation of the luminescence intensity of the photoexcitable storage phosphor as prepared according to this example 1 (and as shown in FIG. 2) with respect to a calibrated X-ray exposure (mGy). FIG. 4 shows a luminescence intensity of Sm$^{2+}$ (690±5 nm) in irradiated BaClF:Sm$^{3+}$ as prepared according to Example 1 of the text, measured with a purpose-built reader (gated excitation/emission with 180 degree phase difference) as a function of exposure to 44 keV X-ray irradiation (Tb Kα) in microGray.

Figure 8:
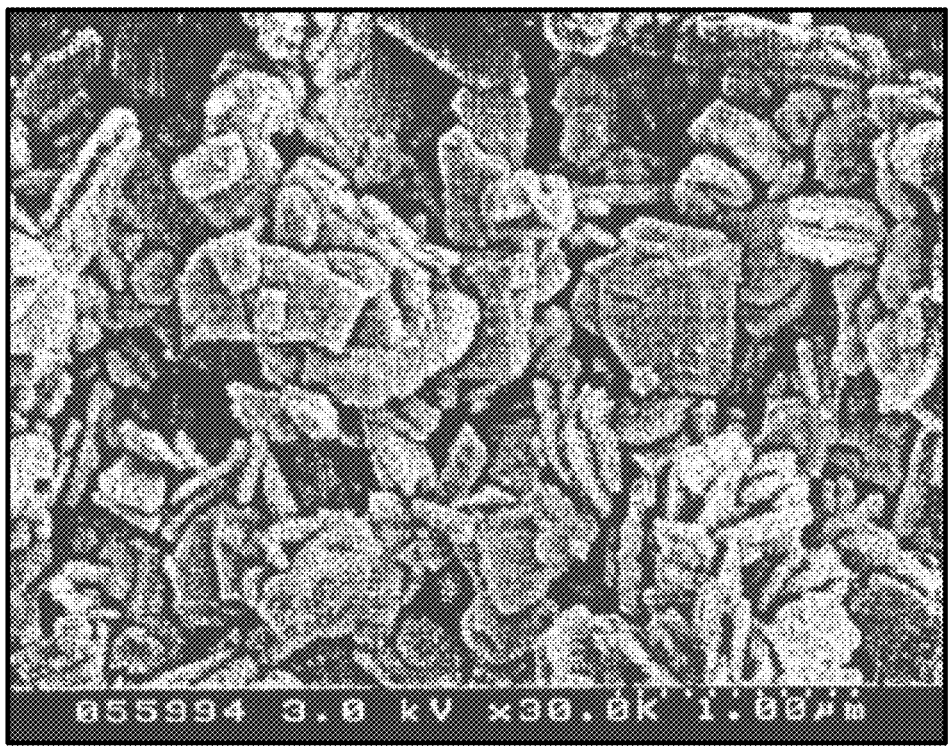
FIG. 8 is a scanning electron microscopy pictorial representation of a preferred embodiment of the photoexcitable storage phosphor, as prepared according to example 1 (see below), of the present invention.

FIG. 8 is a scanning electron microscopy pictorial representation of a preferred embodiment of the photoexcitable storage phosphor, as prepared according to example 1 (see below), of the present invention.

Figure 9:
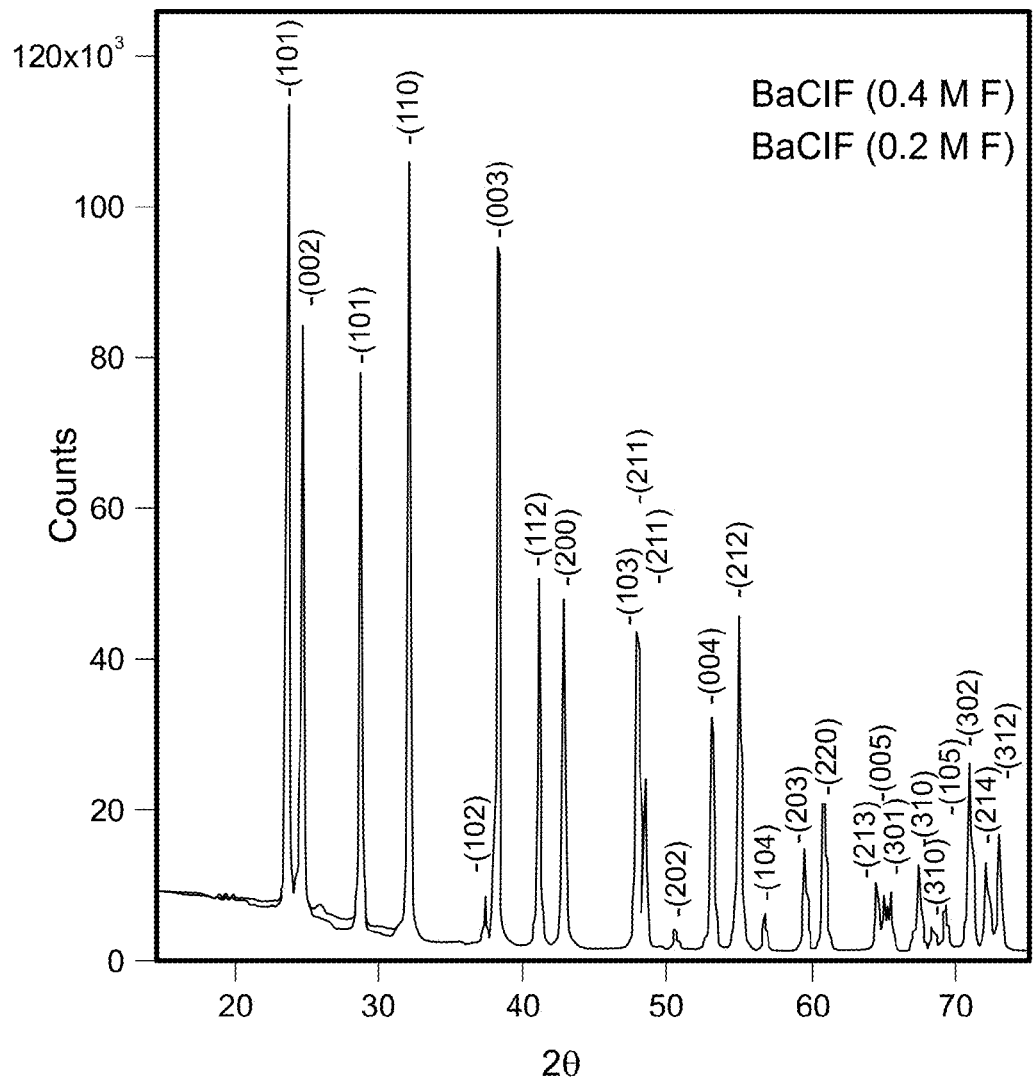
FIG. 9 is a graphical representation of the powder X-ray diffraction pattern of a preferred embodiment of the photoexcitable storage phosphor, as prepared according to example 1 and 2 (see below), of the present invention.
Figure 10:
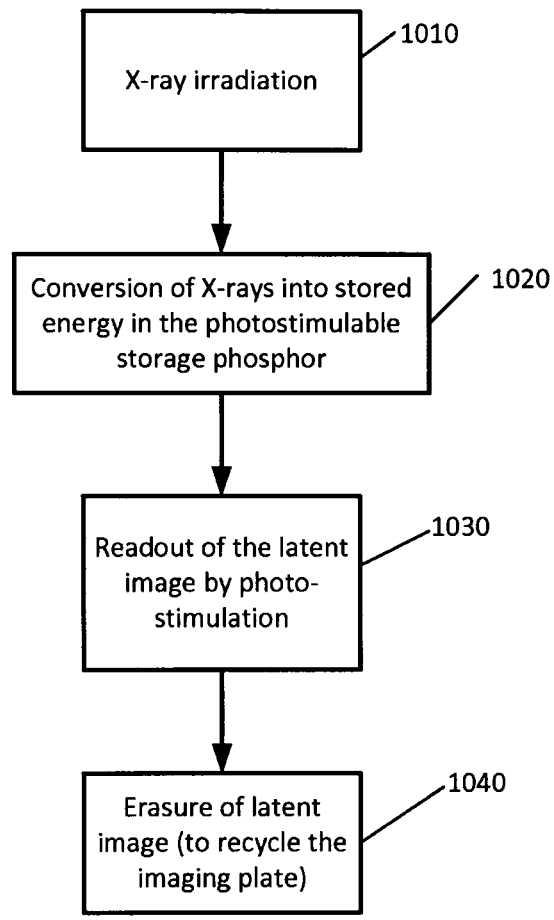
FIG. 10 is a schematic flowchart illustrating a method of X-ray radiation storage and readout using an imaging plate comprising a photostimulable storage phosphor.

FIG. 9 is a graphical representation of the powder X-ray diffraction pattern of a preferred embodiment of the photoexcitable storage phosphor, as prepared according to example 1 (0.2 MF) and also example 2 (0.4 MF). The powder X-ray diffraction pattern of Powder X-ray diffraction pattern of BaClF:Sm$^{3+}$ as prepared according to Example 1 and 2 is as described herein.

Example 2

This preparation is a modification of the process described in Example 1 and yields higher volume of precipitate crystals. First, the salts other than the fluoride are dissolved in an aqueous solution. In a typical preparation, the hydrated barium chloride BaCl$_2$·2H$_2$O and samarium chloride SmCl$_3$·6H$_2$O (0.01-1 wt %) salts are added to water and dissolved under stirring to prepare a solution with a BaCl$_2$ concentration 0.4 M (mol/dm$^3$). The solution is kept at room temperature (20-25° C.). Then, the same volume of an aqueous solution of a fluoride salt, such as ammonium hydrogen difluoride NH$_4$F·HF with the same molar concentration of 0.4 M is added to the solution. The obtained precipitate (i.e. precursor crystals) is separated from the solution by a filtration or centrifugation. The precipitate is then washed with a solvent such as water or methanol and dried at a temperature 90° C. Subsequently, the precursor powders are put into heat-resistant containers, such as quartz or alumina crucibles, and fired in an electric furnace. The temperature range of 400° to 750° C. is suitable for the firing. For example, good X-ray storage properties are obtained by firing for 0.2 hour at 650° C. There are no particular restrictions for the firing atmosphere, in contrast to the case of the presently known activated phosphors. Thus air, reducing (e.g. H$_2$) or inert (e.g. Ar) gases can be employed. The above described process yields tetradecahedral crystals of the $Sm^{3+}$ activated barium fluorochloride phosphor with the space group P4/nmm ($D^{7}_{4h}$) symmetry. The main crystal grain size of the phosphor grains was found to be 100-200 nm, both for the precursor as well as for the fired particles.

FIG. 1 shows a graphical presentation of luminescence intensity of the photoexcitable storage phosphor, as prepared according to this example 2 after X-ray irradiation with respect to a wavelength range from 600 to 800 nm. FIG. 1 shows a graphical representation of a photoexcited (488 nm Ar+ laser line) luminescence of Sm2+ as prepared by this Example. It is noted that none of the narrow $^5D_J\text{-}^7F_J$ luminescence lines are present in un-irradiated samples.

Figure 3:
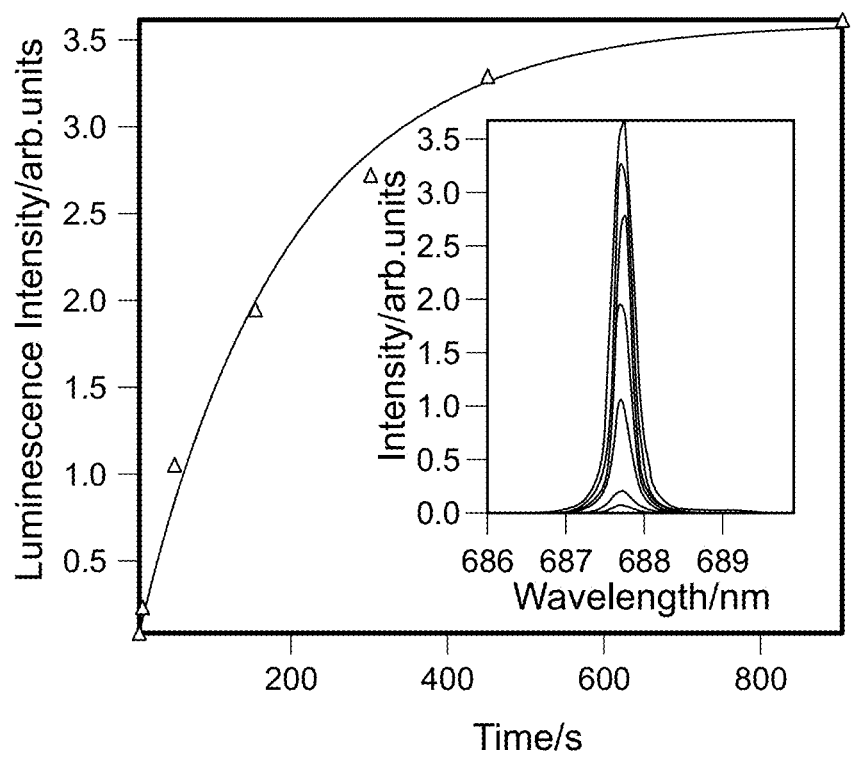
FIG. 3 is a graphical representation of the luminescence intensity of the photoexcitable storage phosphor as shown in FIG. 1 with respect to X-ray exposure time and embedded therein is also a graphical representation of the preferred embodiment of the photoexcitable storage phosphor of the present invention after X-ray irradiation with respect to a wavelength range from 686 to 690 nm.

FIG. 3 is a graphical representation of the luminescence intensity of the photoexcitable storage phosphor of this example (and as shown in FIG. 1 with respect to X-ray exposure time and embedded therein is also a graphical representation of the photoexcitable storage phosphor of this example 2 after X-ray irradiation with respect to a wavelength range from 686 to 690 nm. FIG. 3 also shows saturation of the $^5D_0\text{-}^7F_0$ luminescence line of $Sm^{2+}$ (488 nm Ar+ laser excited) as a function of exposure time of $BaFCl:Sm^{3+}$ to X-ray radiation (Cu—Ka) in a conventional powder X-ray diffratometer.

FIG. 4 is a graphical representation of the luminescence intensity of the photoexcitable storage phosphor of this example with respect to a calibrated X-ray exposure (mGy).

Figure 5:
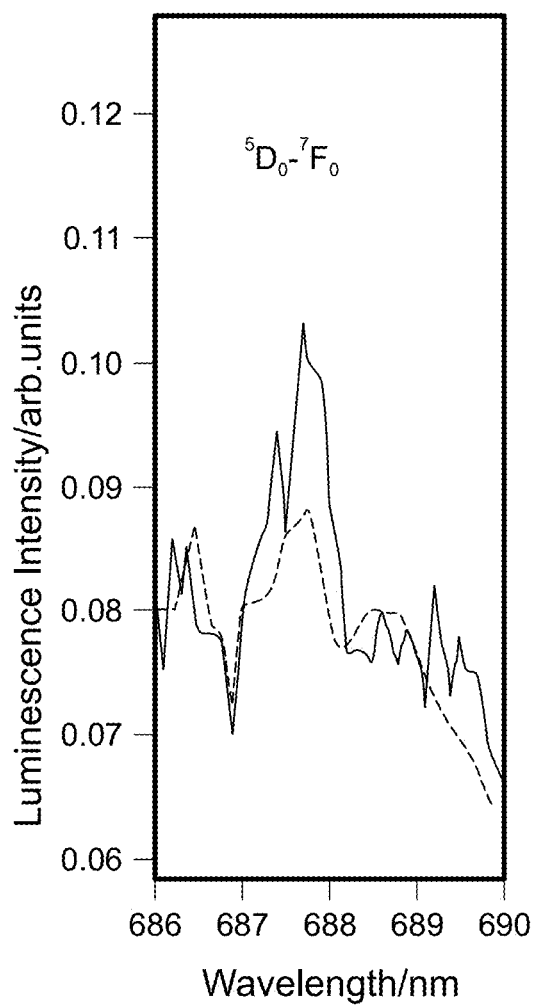
FIG. 5 is a further graphical representation of the luminescence intensity of the preferred embodiment of the photoexcitable storage phosphor of the present invention as prepared according to example 2 after very short exposure to X-ray irradiation with respect to a wavelength range from 686 to 690 nm.

FIG. 5 is a further graphical representation of the luminescence intensity of photoexcitable storage phosphor as prepared according to example 2 after very short exposure to X-ray irradiation with respect to a wavelength range from 686 to 690 nm. FIG. 5 shows the $^5D_0\text{-}^7F_0$ luminescence line of $Sm^{2+}$ after $BaClF:Sm^{3+}$ (0.5%) is exposed to 10 nSv X-ray radiation (Cu—K+=8 keV). This figure illustrates the high sensitivity/efficiency of the photoexcitable storage phosphor of the present is invention. The present commercial phosphor has a maximum sensitivity of 100 nSv. (A well designed scanner may pick up much lower signals.)

Figure 6:
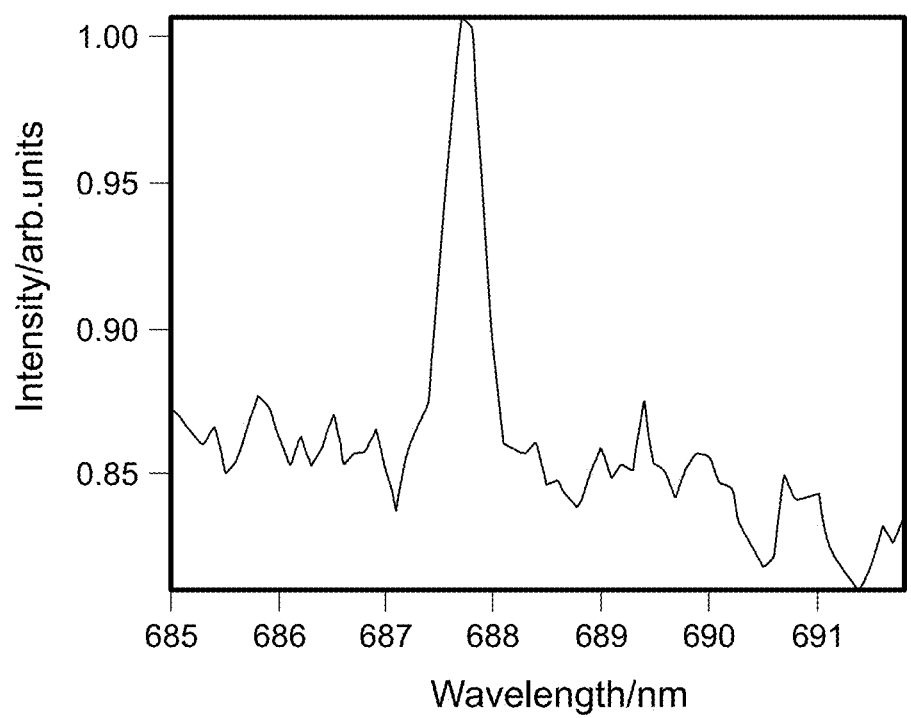
FIG. 6 is a further graphical representation of the luminescence intensity of the preferred embodiment of the photoexcitable storage phosphor of the present invention as prepared according to example 2 after γ-ray irradiation with respect to a wavelength range from 685 to 692 nm.

FIG. 6 is a further graphical representation of the luminescence intensity of photoexcitable storage phosphor according to example 2 after γ-ray irradiation with respect to a wavelength range from 685 to 692 nm. This figure illustrates the applicability of the present phosphor in radiation dosimetry and also shows a $Sm^{2+}$ $^5D_0\text{-}^7F_0$ emission line after γ-ray irradiation of a sample of $BaClF:Sm^{3+}$. The γ-Source is: Co-60 ca. 6 nSv.

Figure 7:
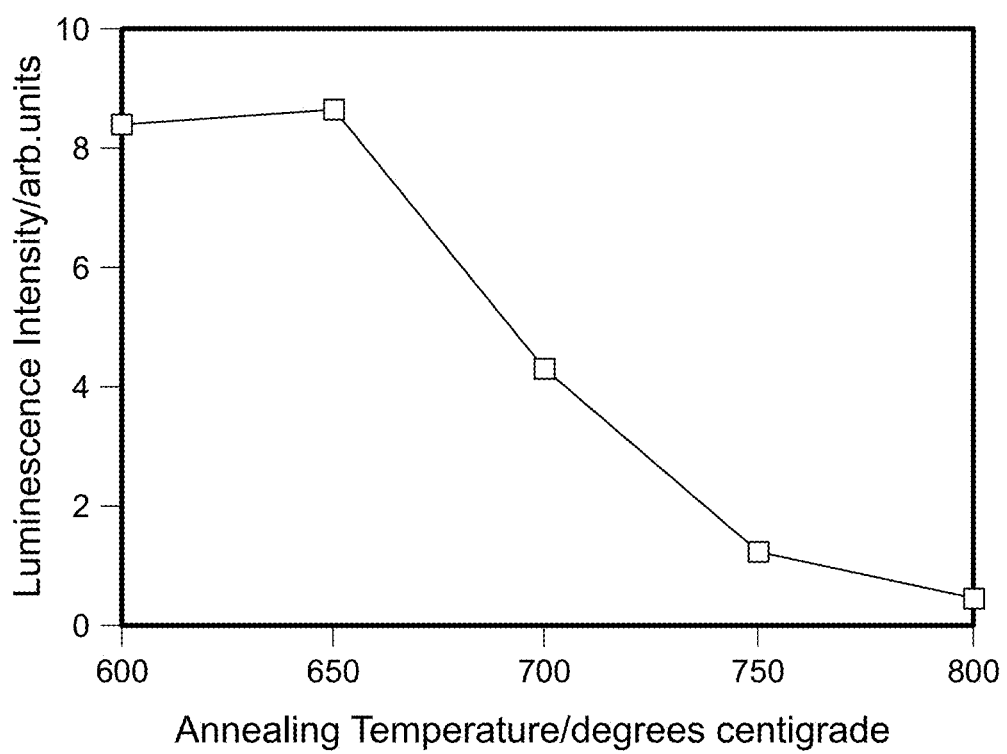
FIG. 7 is a graphical representation of the luminescence intensity of the preferred embodiment of the photoexcitable storage phosphor of the present invention as prepared according to example 2 with respect to the annealing temperature (° C.).

FIG. 7 is a graphical representation of the luminescence intensity of the photoexcitable storage phosphor as prepared according to example 2 with respect to the annealing temperature (° C.) and shows the $Sm^{2+}$ $^5D_0\text{-}^7F_0$ emission line intensity of a X-ray (Cu—K+) irradiated $BaClF:Sm^{3+}$ as prepared according to example 2 as a function of the annealing temperature.

FIG. 9 is a graphical representation of the powder X-ray diffraction pattern of the photoexcitable storage phosphor, as prepared according to example 1 and 2.

Example 3

This method of synthesis produces ultrafine particles of the X-ray storage phosphor by using microemulsions. A microemulsion system comprising CTAB (cetyltrimethylammonium bromide) as the surfactant, n-butanol as the co-surfactant, n-octanol as the oil phase and an aqueous solution as the water phase was selected. This system has been shown to solubilize a large amount of aqueous phase in well-defined nanosize droplets. Microemulsions are prepared by solubilizing different salt solutions into CTAB/n-butanol/n-octanol solutions (weight ratio 10/15/15/60 respectively), Two microemulsions (I and II) but different aqueous phases are taken. The aqueous phase in microemulsion I was a solution of 0.4 M $BaCl_2 \cdot 2H_2O$ and samarium chloride $SmCl_3 6H_2O$ (concentration range: 0.01%-5% of $BaCl_2$ concentration) The aqueous phase in microemulsion II is a solution of ammonium hydrogen difluoride $NH_4F \cdot HF$ with a concentration of 0.4 M, that is to say with an excess of 100% over the stoichiometric requirement for complete precipitation of barium fluorochloride BaFCl. These two microemulsions are then mixed under constant stirring. Due to the frequent collisions of the aqueous cores of water in oil microemulsions the reacting species in microemulsions I and II come into contact (chemical reaction). This leads to the precipitation of Sm activated barium fluorochloride BaFCl particles. The precipitate is then washed with a 1:1 mixture of methanol and dichloromethane to remove any oil and surfactant from the particles, Finally, the powder is centrifuged and dried at 90° C. The obtained precursor is in the form of a fine powder with a mean grain size in range 100-150 nm as estimated by scanning electron microscopy. The subsequent firing process is performed in the same manner as described in Example 2.

The advantages of the preparation procedures described above are summarised below.
1. Increased control over each preparation step;
2. Highly sensitive phosphor can be produced without firing step;
3. Sensitivity and wavelength dependence of sensitivity can be manipulated by firing step;
4. Improved control over phosphor stoichiometry;
5. Improved control over rare earth element doping;
6. The product of preparation is a homogenous powder with submicron particle size and relatively narrow size distribution;
7. Simplified firing procedure, if applied, in relatively low temperature range well below melting point.
8. Powder pre-milling and final milling are not required;
9. The phosphor obtained is stable in air and in humid environments and thus there is no excessive need for protective coatings;
10. Extremely low variations between produced badges of phosphor material;
11. Improved industrial application (especially in image plate manufacturing) in the form of spray or emulsion (imaging plate coating);
12. Simplified preparation procedure based on soft chemistry approach;
13. The preparation process can be easily scaled up; and
14. More cost efficient production.

Modifications and variations such as would be apparent to a skilled addressee are deemed to be within the scope of the present invention. It is to be understood that the scope of the invention should not be restricted to the particular example(s) and/or embodiment(s) described above.

The invention claimed is:
1. A photoexcitable storage phosphor which comprises at least one rare earth element in the trivalent +3 oxidation state and wherein upon irradiation by X-ray, γ-ray or UV radiation the trivalent +3 oxidation state is reduced to divalent +2 oxidation state, and the photoexcitable storage phosphor comprises submicron size particles,
wherein the photoexcitable storage phosphor is represented by a formula (A):
$MeX^1X^2:RE^{3+}$, wherein Me represents a metal ion,

$X^1$ and $X^2$ is independently a halogen atom selected from the group consisting of chlorine, fluorine, bromine, and iodine; and RE is a rare earth element, and comprising the at least one rare earth element in a concentration of about 0.01% to about 5% relative to the metal halide concentration.

2. The photoexcitable storage phosphor according to claim 1, wherein the rare earth element is selected from the group consisting of cerium, praseodymium, neodymium, promethium, samarium, europium, gadolinium, terbium, dysprosium, holmium, erbium, thulium, ytterbium and lutetium.

3. The photoexcitable storage phosphor according to claim 1, wherein the phosphor further comprises an alkaline earth metal selected from the group consisting of barium, calcium and strontium.

4. The photoexcitable storage phosphor according to claim 1, wherein $X^1$ and $X^2$ are not the same as each other.

5. The photoexcitable storage phosphor according to claim 1, wherein the metal ion Me in the photoexcitable storage phosphor as represented by Formula (A) is a divalent metal ion.

6. The photoexcitable storage phosphor according to claim 1, wherein the photoexcitable storage phosphor is an alkaline earth metal fluorohalide which is activated by a rare earth element in the trivalent oxidation state, wherein the rare earth metal is selected from the group consisting of samarium, europium, dysprosium and gadolinium.

7. The photoexcitable storage phosphor according to claim 1, wherein the photoexcitable storage phosphor is represented by the formula selected from the group consisting of $BaFCl:Sm^{3+}$, $CaFCl:Sm^{3+}$, and $SrFCl:Sm^{3+}$.

8. The photoexcitable storage phosphor according to claim 1, wherein the photoexcitable storage phosphor has a tetradecahedral or isomorphous crystal structure.

9. The photoexcitable storage phosphor according to claim 1, comprising a photoexcitable storage phosphor having a crystal grain size of between about 10 and about 1000 nm.

10. A radiation storage panel, device or dosimeter comprising the photoexcitable storage phosphor according to claim 1.

11. A process for recording and reproducing an image comprising the steps of:
(i) exposing a radiation image storage panel comprising a photoexcitable storage phosphor according to claim 1 to radiation which has passed through or radiated from an object;
(ii) exposing the radiation image storage panel to an electromagnetic wave having a wavelength within a range of exciting light wavelength of the photoexcitable storage phosphor, and
(iii) detecting the emitted light.

12. The process according to claim 11, comprising gating the exciting light and the emitted light to allow the detector to be closed when the phosphor is exposed to excitation light and open for at least a period of time while the phosphor is not exposed to excitation light.

13. The photoexcitable storage phosphor according to claim 1, wherein the submicron sized particles are sub-micron sized crystals.

14. The photoexcitable storage phosphor according to claim 1 which produces luminescence lines narrower than 0.5 nm.

15. A process for making a photoexcitable storage phosphor which comprises at least one rare earth element in the trivalent +3 oxidation state and wherein upon irradiation by X-ray, γ-ray or UV radiation the trivalent +3 oxidation state is reduced to divalent +2 oxidation state, and the photoexcitable storage phosphor comprises submicron size particles, wherein the photoexcitable storage phosphor is represented by a formula (A):
$MeX^1X^2:RE^{3+}$, wherein Me represents a metal ion, $X^1$ and $X^1$ is independently a halogen atom selected from the group consisting of chlorine, fluorine, bromine, and iodine; and RE is a rare earth element, and comprising the at least one rare earth element in a concentration of about 0.01% to about 5% relative to the metal halide concentration, the process comprising combining a first solution and a second solution to form a reaction mixture, wherein the first solution comprises a metal halide and a rare earth halide, wherein the halides are independently selected from the group consisting of chloride, bromide and iodide, and the second solution comprises a fluoride species.

16. The process according to claim 15, wherein the metal halide is barium halide and the rare earth halide is samarium halide.

17. The process according to claim 16, wherein the barium halide is barium chloride and the samarium halide is samarium chloride.

18. A process for recording and reproducing an image comprising the steps of:
(i) exposing a radiation image storage panel comprising a photoexcitable storage phosphor according to which comprises at least one rare earth element in the trivalent +3 oxidation state and wherein upon irradiation by X-ray, γ-ray or UV radiation the trivalent +3 oxidation state is reduced to divalent +2 oxidation state, and the photoexcitable storage phosphor comprises submicron size particles to radiation which has passed through or radiated from an object;
(ii) exposing the radiation image storage panel to an electromagnetic wave having a wavelength within a range of exciting light wavelength of the photoexcitable storage phosphor, and
(iii) detecting the emitted light,
wherein step (ii) comprises gating the exciting light and the emitted light to allow the detector to be closed when the phosphor is exposed to excitation light and to open for at least a portion of time while the phosphor is not exposed to excitation light and wherein the detecting step (iii further comprises employing a lock-in amplifier and a modulation technique to modulate a signal generated from the detected emitted light.

19. The process according to claim 18, wherein the wavelength of the exciting light is shorter than the wavelength of the emitted light.

20. The process according to claim 18, wherein the metal ion is barium.

21. The process according to claim 18, wherein the rare earth ion is samarium.

22. The process according to claim 18, wherein the emitted light is detected by a photomultiplier.

23. A process for recording and reproducing an image comprising the steps of:
(i) exposing a radiation image storage panel comprising a photoexcitable storage phosphor according to which comprises at least one rare earth element in the trivalent +3 oxidation state and wherein upon irradiation by X-ray, γ-ray or UV radiation the trivalent +3 oxidation state is reduced to divalent +2 oxidation state, and the photoexcitable storage phosphor comprises submicron size particles, to radiation which has passed through or radiated from an object:

(ii) exposing the radiation image storage panel to an electromagnetic wave having a wavelength within a range of exciting light wavelength of the photoexcitable storage phosphor, and (iii) detecting the emitted light, wherein step (ii) comprises gating the exciting light and the emitted light to allow the detector to be closed when the phosphor is exposed to excitation light and to open for at least a portion of time while the phosphor is not exposed to excitation light and wherein the gating step provides a gated excitation/emission with a 180 degree phase difference.

24. The process according to claim 23, wherein the gating step is facilitated by a chopper.

25. The process according to claim 24, wherein the lifetime of the photoexcited luminescence is longer than 500 microseconds.

26. The process according to claim 25, wherein the lifetime of the photoexcited luminescence is about 2 milliseconds.

27. The process according to claim 23, wherein the emitted light is detected by a CCD camera or a CMOS camera.

28. The process according to claim 23, wherein the excitation light is provided by one or more light emitting diodes (LEDs) that emit light having a wavelength within the range of 380-520 nm.

29. The process according to claim 28, wherein the one or more LEDs emit light having a wavelength of 417±10 nm.

* * * * *